United States Patent
Palalau

(10) Patent No.: US 9,513,922 B2
(45) Date of Patent: Dec. 6, 2016

(54) COMPUTER SYSTEM AND A METHOD FOR GENERATING AN OPTIMIZED PROGRAM CODE

(75) Inventor: Rene Catalin Palalau, Bucharest (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/395,103

(22) PCT Filed: Apr. 20, 2012

(86) PCT No.: PCT/IB2012/052010
§ 371 (c)(1),
(2), (4) Date: Oct. 17, 2014

(87) PCT Pub. No.: WO2013/156825
PCT Pub. Date: Oct. 24, 2013

(65) Prior Publication Data
US 2015/0067662 A1    Mar. 5, 2015

(51) Int. Cl.
*G06F 9/45* (2006.01)
*G06F 9/38* (2006.01)
*G06F 9/30* (2006.01)

(52) U.S. Cl.
CPC ........... *G06F 9/3842* (2013.01); *G06F 8/4441* (2013.01); *G06F 9/30072* (2013.01)

(58) Field of Classification Search
CPC ...... G06F 8/4452; G06F 8/452; G06F 9/3802; G06F 9/3832; G06F 9/3838; G06F 9/3842; G06F 9/30087; G06F 9/30072
See application file for complete search history.

(56) References Cited

U.S. PATENT DOCUMENTS

| | | | |
|---|---|---|---|
| 5,794,029 A * | 8/1998 | Babaian | G06F 9/325 712/241 |
| 6,016,399 A | 1/2000 | Chang | |
| 6,192,515 B1 * | 2/2001 | Doshi | G06F 8/4452 712/241 |
| 6,230,317 B1 | 5/2001 | Wu | |
| 6,571,385 B1 | 5/2003 | Muthukumar et al. | |
| 6,615,403 B1 * | 9/2003 | Muthukumar | G06F 8/4452 712/E9.05 |

(Continued)

OTHER PUBLICATIONS

Mahlke et al, "Characterizing the Impact of Predicated Execution on Branch Prediction" Micro 27, 1994, p. 217-227<Mahlke_94.pdf>.*

(Continued)

*Primary Examiner* — Tuan Vu

(57) ABSTRACT

A computer system for generating an optimized program code from a program code having a loop with an exit branch, wherein the computer system comprises a processing unit, wherein the processing unit is arranged to convert an exit instruction of the exit branch into a predicated exit instruction, wherein the processing unit is arranged to determine common dependencies within the loop, wherein the processing unit is arranged to generate modified dependencies by adding additional dependencies to the common dependencies, and wherein the processing unit is arranged to apply an algorithm that uses software pipelining for generating an optimized program code for the loop based on the modified dependencies.

19 Claims, 7 Drawing Sheets

(56) References Cited

U.S. PATENT DOCUMENTS

| | | | | |
|---|---|---|---|---|
| 6,832,370 B1* | 12/2004 | Srinivasan | ............ | G06F 8/4452 |
| | | | | 712/241 |
| 2003/0233643 A1* | 12/2003 | Thompson | ............ | G06F 8/4452 |
| | | | | 717/161 |
| 2004/0015934 A1 | 1/2004 | Muthukumar et al. | | |
| 2006/0090063 A1* | 4/2006 | Theis | .................... | G06F 8/4451 |
| | | | | 712/239 |
| 2006/0174237 A1* | 8/2006 | Granston | .............. | G06F 8/4452 |
| | | | | 717/161 |
| 2009/0055635 A1 | 2/2009 | Tani | | |
| 2010/0042815 A1* | 2/2010 | Gonion | ................ | G06F 8/4441 |
| | | | | 712/222 |

OTHER PUBLICATIONS

Parthasarathy, Tirumalai, et al: "Parallelization of Loops with Exits on Pipelined Architectures", Software and Systems Laboratory, HPL·90·107, Aug. 1990, pp. 1-19.

International Search Report and Written Opinion correlating to PCT/IB2012/052010 dated Dec. 28, 2012.

\* cited by examiner

Fig. 7
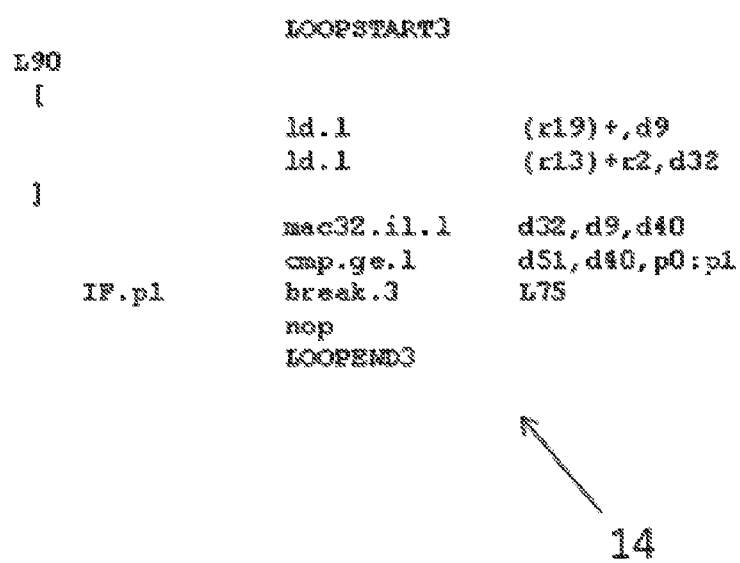
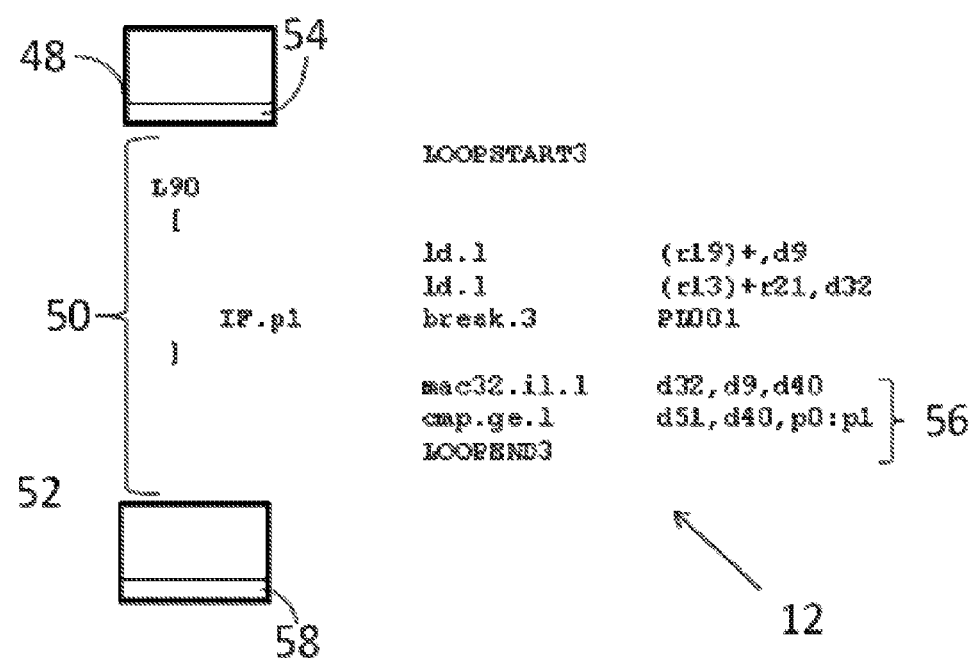

COMPUTER SYSTEM AND A METHOD FOR GENERATING AN OPTIMIZED PROGRAM CODE

FIELD OF THE INVENTION

This invention relates to a computer system and a method for generating an optimized program code.

BACKGROUND OF THE INVENTION

Program code for execution on computer systems may be written in a computer language. The program code may be translated into generic machine code to make it executable by a computer system. The translation of the program code may, for example, be realized via a separate compiler program. The compiler program may automatically generate generic machine code for a specific computer system. This generic machine code may be optimized by the compiler program to take advantage of specific features of the computer system that may accelerate the execution of the generic machine code. The automatic optimization of the machine code may be very difficult due to the complexity of the original program code, and there are many different strategies for the optimizing process, for example, a modulo scheduling algorithm for optimizing loops.

U.S. Pat. No. 6,571,385 describes an algorithm for optimizing loops having more than one exit. The described algorithm is based on a predication for each exit. Each of the used predications is examined when the loop is left to determine the exit condition.

U.S. Pat. No. 6,016,399 describes an iterative scheduling algorithm for a loop. The scheduling algorithm is based on percolating instructions into previous loop iterations.

Parthasarathy P. Tirumalai, M. Lee, Michael S. Schlansker, "Parallelization of loops with exits on pipelined architectures", SC., pp 200-212, 1990 describes a method for transforming a loop with a plurality of exits into a loop with a single exit prior to applying the optimization.

SUMMARY OF THE INVENTION

The present invention provides a computer system and a method for generating an optimized program code as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 7 schematically shows exemplary program codes.

DETAILED DESCRIPTION OF THE PREFERRED EMBODIMENTS

Figure 1:
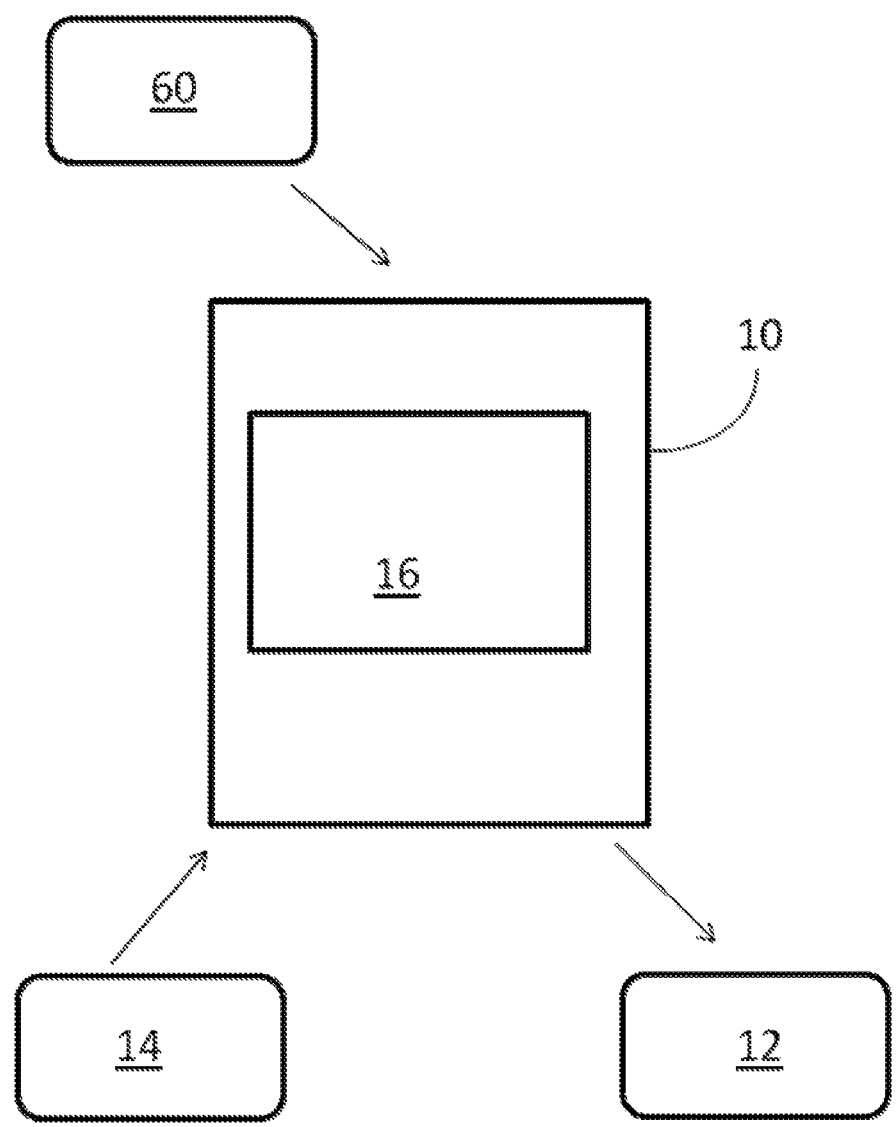
FIG. 1 schematically shows an example of an embodiment of a computer system.

Because the illustrated embodiments of the present invention may for the most part, be implemented using electronic components and circuits known to those skilled in the art, details will not be explained in any greater extent than that considered necessary, as illustrated, for the understanding and appreciation of the underlying concepts of the present invention and in order not to obfuscate or distract from the teachings of the present invention.

Although the definition of terms hereinafter used should not be construed as limiting, the term as used are understood to comprise at least the following.

The term "program code" may be used for a sequence of instructions that may represent a computer program. The computer program may comprise machine code and may be executed by a computer system. The machine code of the computer program may, for example, comprise write instructions and read instructions for accessing a memory of the computer system. Write instructions may alter the memory by writing information to the memory, and read instructions may retrieve information from the memory.

The term "program flow" may describe the order in which the instructions of the computer program may be executed. Depending on the program flow, the instructions may be divided into prior and following instructions. "Prior" may be used for instructions that have been already executed. "Following" may be used for instructions that may be executed in future.

The term "optimized program code" may be used for an altered program code that may need less time for execution but may represent the same computer program, e.g., produce the same results.

The term "loop" may be used for a consecutive set of instructions in the program code that may be at least partly repeated several times. The term "loop instruction" may be used for all instructions of the loop, i.e., all instructions of the consecutive set of instructions. When the loop is not optimized with a software pipelining algorithm, all instructions of the unoptimized loop may be repeatedly executed. When the loop is optimized with a software pipelining algorithm, the optimized loop may comprise a loop prolog, a loop kernel, and a loop epilog. The loop prolog may contain instructions of one or more iterations of the unoptimized loop. The loop epilog may contain instructions of one or more iterations of the unoptimized loop. The loop kernel may contain instructions of two or more iterations of the unoptimized loop that may define a "steady state" execution, i.e., a sequence of instructions that may be viewed as an alternative loop. By interleaving instructions from multiple iterations of the unoptimized loop in a single iteration of the optimized loop, the resulting maximal iteration count of the loop kernel may be smaller than the maximal iteration count of the unoptimized loop. The execution of the loop prolog may be completed before the execution of the loop kernel starts, and the execution of the loop kernel may be completed before the execution of the loop epilog starts. The loop instructions in the loop kernel may be at least partially executed in parallel. The last few loop instructions of the loop prolog may be called a loop prolog end. The last few loop instructions of the loop kernel may be called a loop kernel end. The instructions of the loop kernel end may be not parallelly executable. The last few loop instructions of the loop epilog may be called a loop epilog end.

The term "branch" may describe a sequence of instructions in the program code that may be conditionally executed depending on whether or not a specific condition is logically true at a branch point. Each instruction in the sequence of instructions that may be conditionally executed may be called a branch instruction. The term "branch point" may be used for a specific instruction in the program code where the specific condition is checked. For example, the branch point may be either a simple true/false decision or a multiple branch decision. The program flow of the computer program may be altered depending on the decision, i.e., not all following instructions may be executed. The specific condition may only be checked at the branch point, and changing the value of the specific condition may not influence the program flow when the check is completed.

The term "exit branch" may be used for a branch in a loop that may alter the program flow such that the loop may be left before an end of the loop is reached. The term "exit instruction" may be used for an instruction in the exit branch that may alter the program flow such that the loop may be left before an end of the loop is reached. The end of the loop may, for example, be defined by the last instruction of the loop.

The term "predication" may be used for a prefix and/or an appendix to an instruction that conditionally allows either executing the instruction or doing nothing. The term "predicated" may be used to indicate that a specific instruction will be executed conditionally. A predicated instruction may have a predication. Executing the predicated instruction may describe that the predication may be checked before the predicated instruction may be executed or skipped. For example, the predicated instruction may be executed when the predication is logically true and may be skipped when the predication is logically false. The term "non-predicated" may be used to indicate that an instruction will be executed unconditionally. A non-predicated instruction may have no predication.

The term "dependency" may be used for a relation between two instructions in a loop that must be executed in a specific order because otherwise the result of the computer program may be altered. The term "common dependency" may be used for a dependency in the loop that may be a basic block or may be treated as a basic block. The term "basic block" may be used for a set of instructions, wherein the execution of the first instruction in a basic block may be followed by the execution of the rest of the set of instructions, and each instruction may be executed exactly once, in order. The term "modified dependencies" may be used for a sum of common dependencies and additional dependencies.

The term "modulo scheduling algorithm" may be used for a group of optimizing algorithms that may generate software pipelined code for loops.

The term "load speculation scheme" may be used to describe a method for reducing latencies by reading information from the memory in advance on spec whenever the memory bus may be free and a following read instruction may be expected. The load speculation scheme may resolve at least some of the modified dependencies and may reduce the total number of modified dependencies.

The term "directive instruction" may be used for an annotation in the program code that may control a computer system that generates machine code representing the computer program. The directive instruction may have no influence on the result of the computer program. A directive instruction may, for example, be a marking in a program listing that is not an instruction but may influence the encoding and/or the execution of other instructions in the program listing.

Now referring to FIG. 1, an example of an embodiment of a computer system is schematically shown. The computer system 10 may comprise a processing unit 16. The computer system 10 may be arranged to execute a method described hereinafter. The computer system 10 may, for example, execute the method in form of a compiler program. Portions of the method may be executed by the processing unit 16. When the computer system 10 is a programmable apparatus, a computer program product 60 comprising at least code portions for executing blocks of the method described hereinafter may provide the compiler program. The computer system 10 may be arranged to generate an optimized program code 12 from a program code 14. The program code 14 may be supplied to the computer system 10. The optimized program code 12 may be optimized machine code, and the program code 14 may, for example, be machine code or a code in a high level programming language, i.e., a program listing. The program code 14 may have a loop with an exit branch. The processing unit 16 may be arranged to convert an exit instruction of the exit branch into a predicated exit instruction. The processing unit 16 may be arranged to determine common dependencies within the loop. The processing unit 16 may be arranged to generate modified dependencies by adding additional dependencies to the common dependencies. The processing unit 16 may be arranged to apply an algorithm that uses software pipelining for generating an optimized program code 12 for the loop based on the modified dependencies. This will be explained in more detail in connection with FIG. 3.

Figure 2:
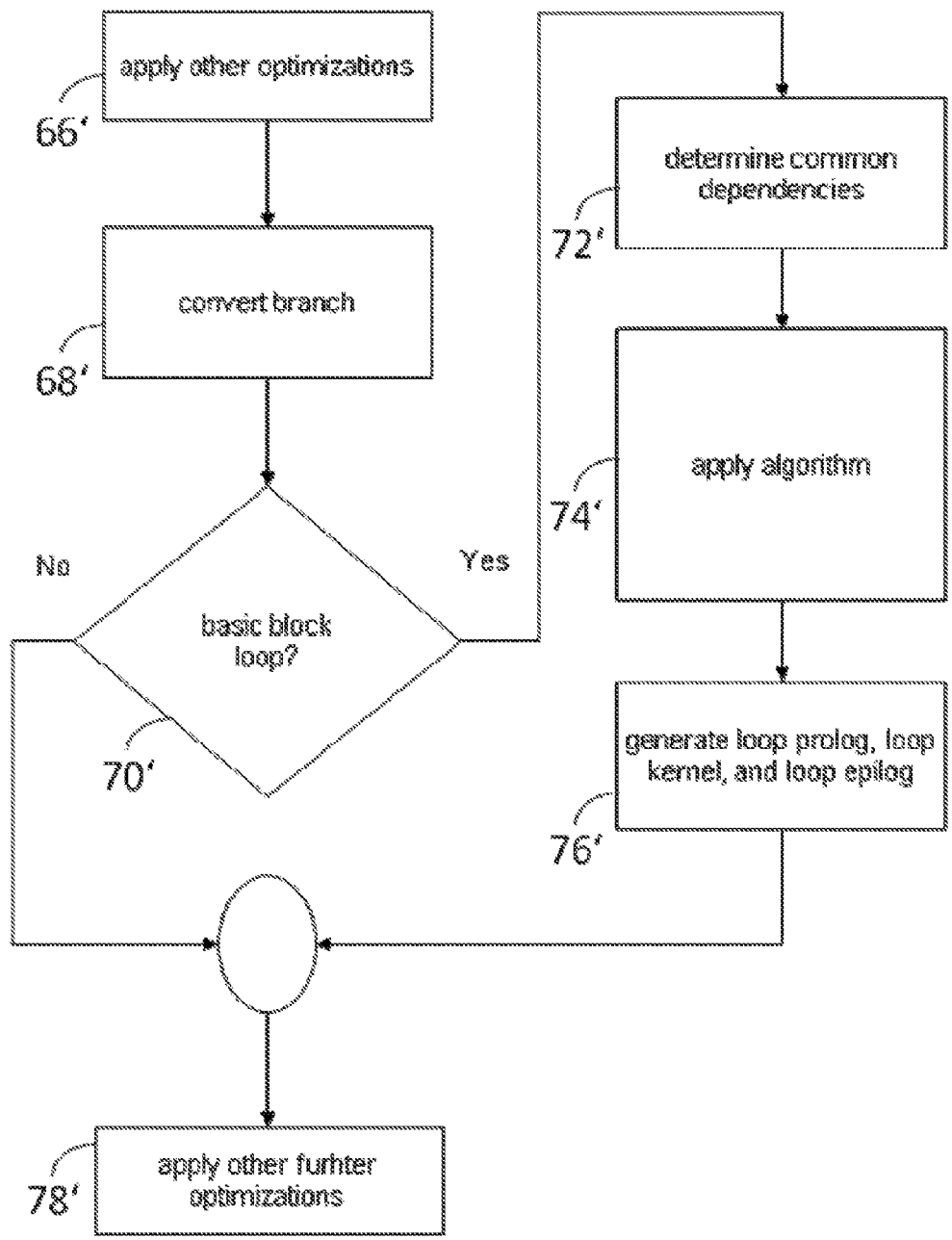
FIG. 2 schematically shows a flow diagram of a prior art optimization method.

Now referring to FIG. 2, a flow diagram of a prior art optimization method is schematically shown. The flow diagram schematically explains a method 64' for generating optimized program code from a program code. The method 64' shown in FIG. 2 may be executed by the computer system 10 already known from FIG. 1. The method 64' may optimize a program code that may comprise a loop. The method 64' may start at block 66'. In block 66', other optimizations, for example, data-flow optimizations based on data-flow analyses, may be applied to the program code. The method 64' may continue at block 68'. In block 68', branches in the loop may be converted. For example, predications may be added to all branch instructions of the branches. Predicated branch instructions may be treated like other loop instructions. Converting the branches by adding predications may remove the branches. The method 64' may continue at block 70'. In block 70', the loop may be checked for being a basic block.

A simple loop that may be a basic block may have a single exit at the end of the loop. Such a simple loop may be a basic block because every loop instruction will be executed once before the single exit at the end of the loop may be reached. As mentioned before, the predicated branch instructions may be executed in order like other loop instructions, and the loop may be a basic block when all branches are converted. When the loop is not a basic block, the method 64' may continue at block 78'. In block 78', other further optimizations, for example, dead code elimination which removes instructions that will not affect the behaviour of the program code, may be applied to the program code.

When the loop is a basic block, the method 64' may jump from block 70' to block 72'. In block 72', common dependencies between the loop instructions may be determined. The basic principle for the determination of common dependencies will be explained in connection with FIG. 6. The automatic determination of common dependencies in a basic block may be well known to a person skilled in the art. Block 74' may be executed when block 72' is completed. In block 74', an algorithm may be applied to the loop instructions. The algorithm may be an instruction scheduling algorithm based on the common dependencies, wherein the scheduling of the instructions may be done by a compiler program when the machine code of the program is generated and not at runtime by a processor. The algorithm may be a software pipelining algorithm and/or a modulo scheduling algorithm and/or any other known algorithm for generating software pipelined loops based on the common dependencies. The algorithm may comprise the calculation of a maximum iteration interval that may describe a maximal overlap between loop instructions of consecutive loop iterations. When the iteration interval is large, many loop instructions may be executed independently in parallel. The maximum iteration interval may be related to the loop kernel that may be at least partially executed in parallel. The principles of the algorithms may be well known to a person skilled in the art and will not be explained herein in any greater detail.

When block 74' is completed, the method 64' may continue at block 76'. In block 76', i.e., when the algorithm is completed, a loop prolog, a loop kernel, and a loop epilog may be generated. The execution of the loop prolog may be completed before the execution of the loop kernel may be started, and the execution of the loop kernel may be completed before the execution of the loop epilog may be started. The loop instructions of the loop kernel may be at least partially executed in parallel. The loop prolog and/or the loop kernel and/or the loop epilog may be defined by the common data dependencies within the loop. When block 76' is completed, the method 64' may continue at block 78'. When the loop is not a basic block, the algorithm may be not applied to the loop.

Figure 3:
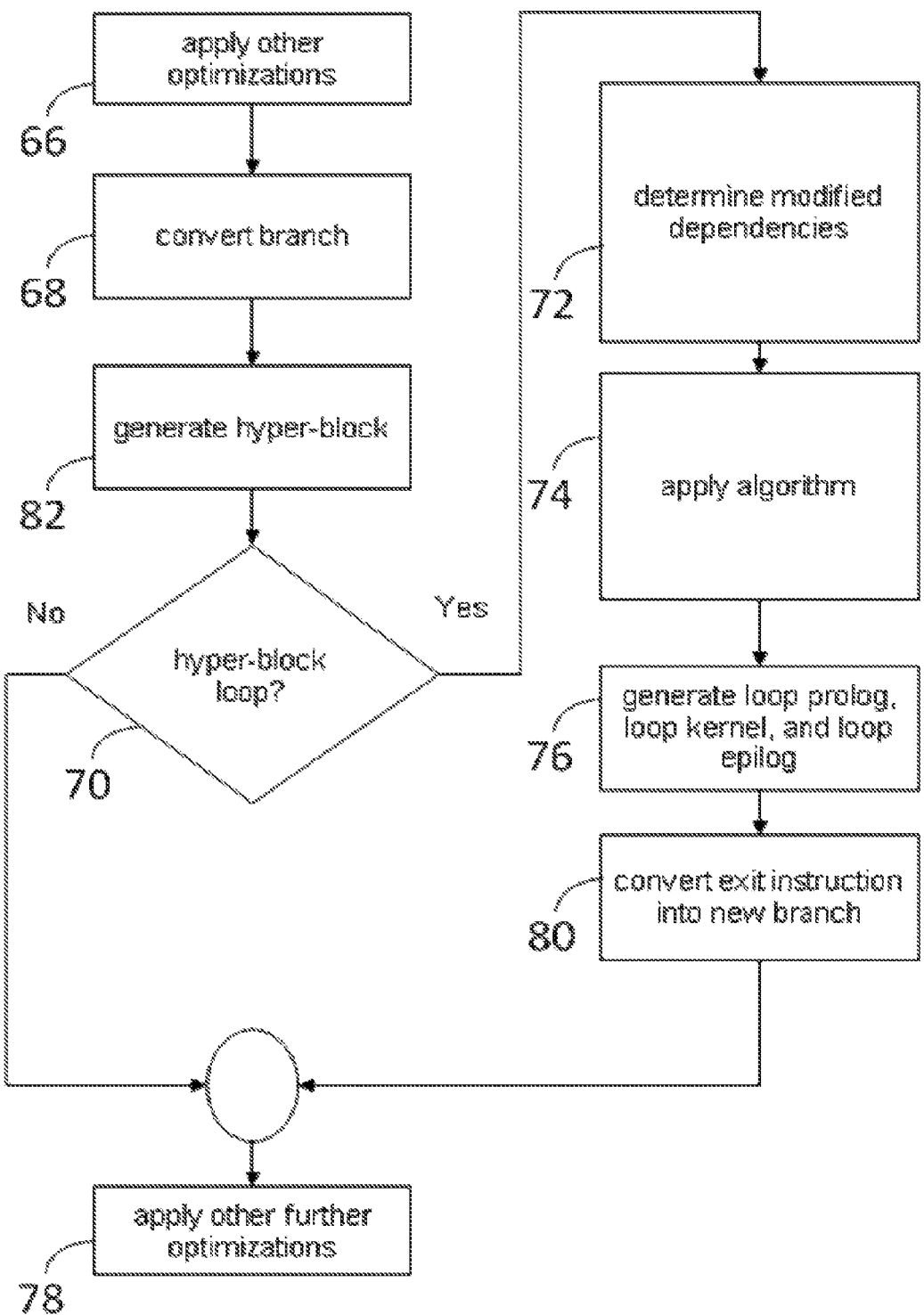
FIG. 3 schematically shows a flow diagram of an optimization method.

Now referring to FIG. 3, a flow diagram of an optimization method is schematically shown. FIG. 3 schematically explains a method 64 for generating optimized program code from a program code. The optimized program code may be optimized machine code, and the program code may, for example, be machine code or code in a high level programming language. Blocks of the method 64 as shown in FIG. 3 may be executed by the computer system 10 already known from FIG. 1. The method 64 may optimize a program code that may comprise a loop having a plurality of exits. A loop having a plurality of exits may not be a basic block. The method 64 described in FIG. 3 may allow the application of an algorithm to a loop that may be not a basic block but instead a hyper-block as will be explained in the following.

The method 64 may start at block 66. In block 66, other optimizations, for example, data-flow optimizations based on data-flow analyses, may be applied to the program code. When block 66 is completed, the method may proceed at block 68. In block 68, the branch instructions in the loop may be converted into predicated branch instructions to remove the branches. When the branch is an exit branch, the exit branch may be converted into a branch having a predicated exit instruction. The loop may comprise a plurality of branches and a plurality of exit branches. When two or more conditionally independent branches are converted, different predications may be used. The predicated branch instructions may be scheduled within the loop with respect to dependencies just like non-predicated loop instructions.

When block 68 is completed, the loop and the loop instructions comprising the predicated branch instructions may be considered to be a hyper-block in block 82. The method 64 may continue at block 70. In block 70, the method may check whether the loop is a hyper-block that may be used for the algorithm. The test that may be executed at block 70 may be overridden based on a directive instruction that marks the loop for applying the algorithm. The test that may be executed in block 70 will be explained in connection with FIG. 4.

When the loop is a hyper-block that is not accepted for the algorithm and when the loop is not marked with a directive instruction, the method 64 may continue at block 78. In block 78, other further optimizations, for example, dead code elimination which removes instructions that will not affect the behaviour of the program code, may be applied to the program code.

When the hyper-block is accepted, i.e., when the hyper-block may be used for the algorithm, the method 64 may continue at block 72. In block 72, modified dependencies between the loop instructions may be determined. The modified dependencies may comprise the common dependencies and additional dependencies. The common dependencies may be determined identically to the dependencies determined in block 72' of method 64' as described in connection with FIG. 2. In general, the common dependencies for the hyper-block may be determined without respecting the predicated exit instructions, wherein the rest of the loop instructions in the hyper-block may be handled as a basic block. The additional dependencies may fully respect the predicated exit instructions. The additional dependencies may ensure that the modified dependencies comprise all dependencies that may produce an effect on the result of the program code without handling the exit instructions as control flow instructions. The modified dependencies may be used instead of complete dependencies that also comprise dependencies associated to the program flow, e.g., dependencies from the predicated exit instructions. The algorithm may be used with the modified dependencies without any modifications. When the complete dependencies are used, the algorithm may be modified to yield correct program code. The complete dependencies may comprise many dependencies that may be unnecessary for the algorithm and that may not be represented by the modified dependencies. The performance of the optimized program code/loop may be improved when the number of necessary dependencies can be decreased. The basic principle for the determination of the common dependencies will be explained in connection with FIG. 6.

Generally, a write instruction and/or a read instruction may access a memory or a register. The memory may, for example, be common main memory of a computer system. The access may be related to a specific memory location or to a specific location of the register. The register may, for example, be an internal buffer of the processing unit. It should be understood that the processing unit may comprise a plurality of different registers that may be called the register for simplicity only. Data may be loaded from the memory into the register before a manipulation of the data is executed. A result of the manipulation, e.g., the manipulated data, may be written back to the register and may be subsequently written back into the memory. A write instruction that accesses the memory may be called a write memory instruction. A write instruction that accesses the register may be called a write register instruction. Similarly, a read instruction that accesses the memory may be called a read memory instruction, and a read instruction that accesses the register may be called a read register instruction. A write instruction and/or a read instruction may have a side effect, e.g., an effect that changes a result and/or a behaviour of the computer program. For example, an instruction that may access the memory may cause an exception or may write into a memory location, wherein it is unknown whether this memory location is accessed by other parts of the computer program.

The method described herein may maintain dependencies that are related to write register instructions and read register instructions in a way that may be equated to speculation. Make dependencies only between the exit instruction and write register instructions, wherein the register may be used outside of the loop, may be equivalent to speculate all write register instructions except those that may be used also outside of the loop. For write memory instructions and read memory instructions an ordering may be stricter because they may have a side effect. Dependencies related to memory write instructions may be maintained correct. This may include dependencies related to the exit instruction. The read memory instruction may be either transformed into a non-faulting memory read instruction, or speculated based on a directive instruction, for example, a pragma, or remain unspeculated. The non-faulting memory read instruction may no longer have a side effect as the non-faulting memory read instruction may not generate an exception. The non-faulting memory read instruction may be speculated afterwards. The directive instruction may force the speculation of the marked dependency. The unspeculated read memory instruction may have a dependency to the exit instruction. The additional dependencies may comprise dependencies of a first group of dependencies and/or dependencies of a second group of dependencies. The first group of dependencies may comprise dependencies between a predicated exit instruction and prior loop instructions that are write memory instructions or write register instructions, wherein the register is used outside of the loop, and wherein the prior loop instructions are non-predicated or are predicated not opposite to a predication of the predicated exit instruction. The second group of dependencies may comprise dependencies between the predicated exit instruction and the following loop instructions that may be non-predicated write instructions. The first group of dependencies may comprise true dependencies. A true dependency or flow dependency may occur when the result of the execution of a first instruction may be needed for the execution of a second instruction. A true dependency cannot be removed. The second group of dependencies may comprise anti-dependencies. Anti-dependencies may occur when a second instruction destroys a value used by a first instruction. Anti-dependencies may directly result from storage conflicts. The additional dependencies may also comprise a third group of dependencies. The third group of dependencies may comprise dependencies between the predicated exit instruction and the following loop instructions that may be read memory instructions. When the loop comprises more than one predicated exit instruction, the first group and/or the second group and/or the third group may comprise dependencies due to each of the predicated exit instructions. The read instructions that may be associated with the third group of dependencies may be replaced by non faulting read instructions, and/or the additional dependencies may not comprise the third group of dependencies. The use of non faulting read instructions may resolve the dependencies from the third group of dependencies. The term "non faulting read instruction" may be used for a read instruction that secures the reading of the "correct" information from the memory. "Correct" may be used to describe that rescheduling another loop instruction that affects the result of the read instruction such that it may be executed before the read instruction may be executed yields the same result as when the other instruction is executed after the read instruction. Non faulting read instructions may be directly provided by the computer system. Replacing the read instructions associated with the third group of dependencies with non faulting read instructions may reduce the number of the modified dependencies for better optimized program code.

At least one of the modified dependencies may be removed when a load speculation scheme is applied to the program code. The load speculation scheme may also resolve the dependencies of the third group.

At least one of the modified dependencies may be removed based on a directive instruction that manually indicates an independency. At least one dependency may be added to the modified dependencies based on a directive instruction that manually indicates a dependency. Such a directive instruction may directly control the method and/or the compiler program and/or the computer system that may execute the method. Directive instructions for directly controlling the method and/or the compiler program and/or the computer system may be called "pragmas". For example, a directive instruction that may indicate a dependency may have the form "#dependent", and/or a directive instruction that may indicate an independency may have the form "#independent". It may be possible to add further arguments to directive instructions for specifying the dependency/independency. Directive instructions may be used to remove dependencies of the third group.

When block 72 is completed, the method may proceed at block 74. In block 74, an algorithm may be applied to the hyper-block based on the modified dependencies. The algorithm may generate an optimized program code for the loop and/or the program code. The algorithm may be an instruction scheduling algorithm based on the modified dependencies, wherein the scheduling of the instructions may be done by a compiler program and/or a processing unit when the machine code of the program is generated and not at runtime when the computer program is executed. The algorithm may be a software pipelining algorithm and/or a modulo scheduling algorithm and/or any other known algorithm for generating software pipelined loops that may work with common dependencies for optimizing simple loops having only one exit at its end. The algorithm may comprise the calculation of a maximum iteration interval that may describe a maximal overlap between loop instructions of consecutive loop iterations. When the iteration interval is large, many loop instructions of consecutive loop iterations may be executed independently in parallel. The maximum iteration interval may be related to the loop kernel that may be at least partially executed in parallel. The principles of the algorithm may be well known to a person skilled in the art and will not be explained herein in any greater detail.

The method 64 may proceed at block 76 when block 74 is completed. In block 76, i.e., when the algorithm is completed, a loop prolog, a loop kernel, and a loop epilog may be generated. The execution of the loop prolog may be completed before the execution of the loop kernel may be started, and the execution of the loop kernel may be completed before the execution of the loop epilog may be started. The loop instructions of the loop kernel may be at least partially parallelly executed. The loop prolog and/or the loop kernel and/or the loop epilog may be defined by the modified data dependencies within the loop.

When block 76 is completed, the method 64 may continue at block 80. In block 80, the predicated exit instruction may be transformed into a new (exit) branch. Transforming the predicated exit instruction into a new exit branch may transform the predicated exit instruction. The transformation may, for example, be reverse to the transformation described in connection with block 68. The transformation at block 68 may not remove the predication from the exit instruction but only transform the predicated exit instruction to sustain the conditional execution of the exit instruction. A target of the new branch may be moved to a loop epilog end. The method 64 may not rely on predications for each exit instruction because they may be converted back into exit branches when the execution of the algorithm is completed. When block 80 is completed, the method may continue at block 78.

Figure 4:
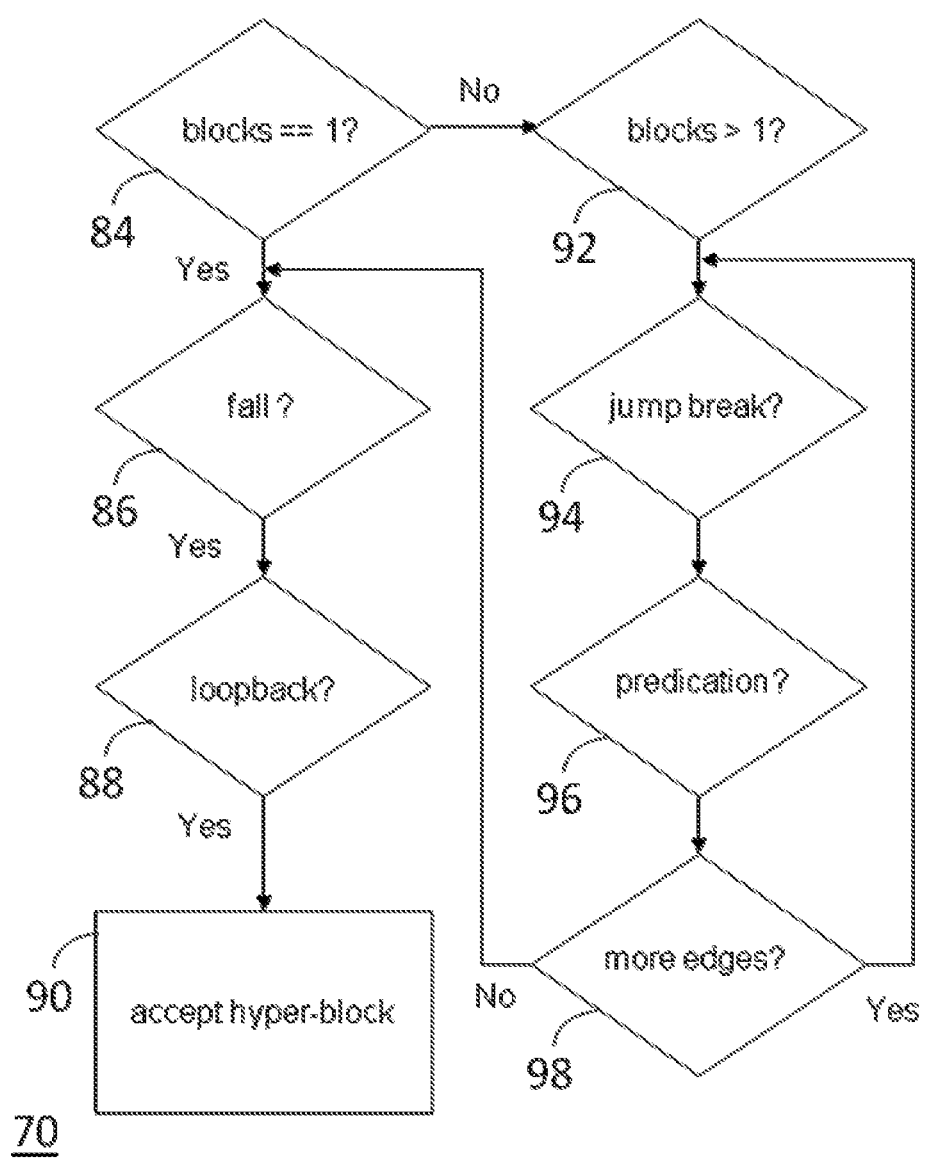
FIG. 4 schematically shows a flow diagram of a hyperblock test.

Now referring to FIG. 4, a flow diagram of a hyper-block test is schematically shown. The complete test 70 may be identified with block 70 already known from FIG. 3. The test 70 may start at block 84. In block 84, it may be checked whether the hyper-block comprises exactly one basic block. When the hyper-block comprises exactly one basic block, the test 70 may proceed at block 86. In block 86, it may be checked whether a subsequent block that may follow the hyper-block may be reached through a fall edge. An edge may, for example, be a connection in a flow diagram between different blocks. An edge may be identified with a branch in the program flow. The fall edge may be a connection between two blocks that may be used when the loop normally ends, i.e., a connection between the hyper-block and the subsequent block. The fall edge may, for example, correspond to passing control to another block, e.g., the subsequent block that may follow the hyper-block when none of the (following) branch instructions are executed because their condition is false. When block 86 is completed, the test 70 may proceed at block 88. In block 88, it may be checked whether the first basic block may be reached from the last basic block through a loopback edge. The loopback edge may represent the normal program flow when the loop is repeated. The loopback edge may, for example, be a jump instruction at the loopend. When block 88 is completed, the test 70 may proceed at block 90. In block 90, the hyper-block may be accepted for the algorithm. When one of the checks at block 86 or 88 fails, the test 70 may terminate, and the hyper-block may not be accepted for the algorithm. The direct program flow from block 84 to block 90 via blocks 86 and 88 may preserve the prior art optimizing method 64' described in connection with FIG. 2 because the hyper-blocks that may be accepted via this direct flow path may represent simple loops already known from the method 64' described in connection with FIG. 2. No additional dependencies may be added to the common dependencies of the simple loop because it does not comprise a predicated exit instruction. When the modified dependencies are identical to the common dependencies, the optimized program code that may be generated by the method 64 may be identical to the optimized program code that may be generated by the prior art method 64'. The method 64 may be applied to loops having multiple exits and also to simple loops having only one exit at the end of the loop while using the same algorithm.

The test 70 may proceed at block 92 when the hyper-block does not comprise exactly one basic block. In block 92, it may be explicitly checked whether more than one basic block, e.g., a first basic block and a second basic block, may be merged into the hyper-block. Block 92 may be optional. When more than two basic blocks may be merged into the hyper-block, the test 70 may proceed at block 94. In block 94, it may be checked whether a jump break edge exits, i.e., an edge that may be neither the fall edge nor the loopback edge. The jump break edge may, for example, connect the first basic block with the subsequent block that follows the hyper-block. When the jump break edge connects the first basic block with the subsequent block that follows the hyper-block, the last basic block of the hyper-block may be skipped on exiting the loop via the jump break edge. When block 94 is completed, the test 70 may proceed at block 96. In block 96, it may be checked whether an exit instruction that may be an origin for the jump break edge determined in the previous block 92 has been properly predicated, e.g., checked that the predication may be a non empty condition. An empty condition may, for example, be a condition that may be always logically true or always logically false. An evaluation of an empty condition may not be necessary. A non empty condition may be a condition that must be evaluated to determine whether its value may be logically true or logically false. When block 96 is completed, the test may proceed at block 98. In block 98, it may be checked whether the hyper-block comprises more unchecked edges that may be neither the fall edge nor the loopback edge. The blocks 94, 96, and 98 may describe a loop within the test 70 that may be repeated until all edges that may be neither the fall edge nor the loopback edge are checked. When all edges that may be neither the fall edge nor the loopback edge are checked, the test 70 may proceed at block 86. As previously mentioned, block 86 may be for checking the fall edge, and the following block 88 may be for checking the loopback edge. When one of the checks fails, i.e., one of the checks in blocks 92, 94, 96, 86, and 88, the test 70 may terminate, and the hyper-block may not be accepted for the algorithm. It should be understood that detecting the edges within the loop and checking their properties may be well known to a person skilled in the art and may be automatically executed, for example, by a compiler program.

Figure 5:
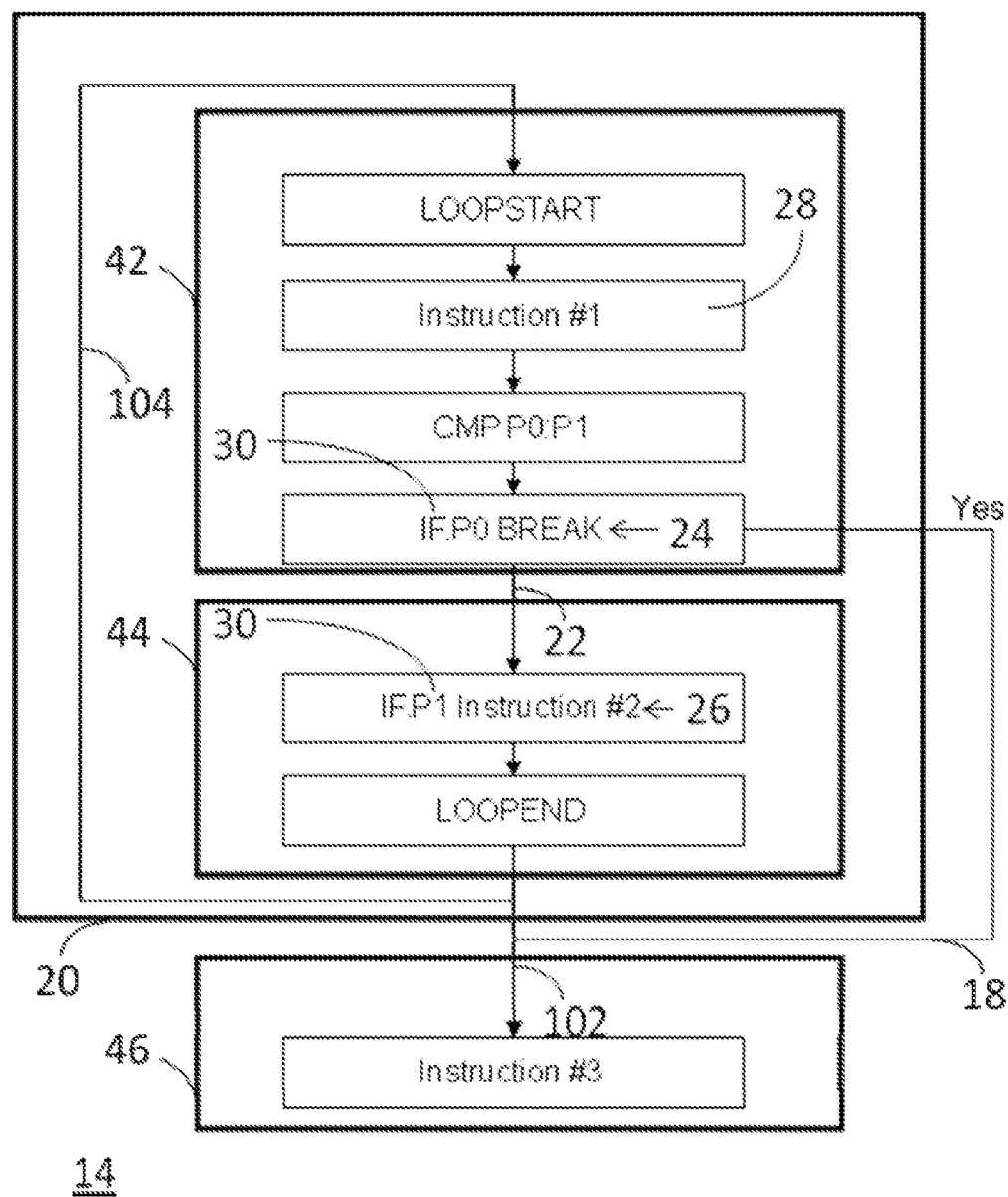
FIG. 5 schematically shows an exemplary flow diagram for a program code.

Now referring to FIG. 5, an exemplary flow diagram for a program code is schematically shown. The pictured program code 14 may comprise a first basic block 42, a second basic block 44, and a third basic block 46. The first basic block 42 and the second basic block 44 may be part of a loop 20. The loop 20 may be used for the algorithm when it passes the test 70 described in connection with FIG. 4. The loop 20 may be called a hyper-block. The first basic block 42 may start at a loopstart and may comprise loop instructions 28 that may be symbolized with the term "instruction #1". The following evaluation instruction "cmp P0:P1" may, for example, describe a logical comparison whose result may be stored into P0 and P1. P0 and P1 may be predicates that may be, for example, either logically true or logically false. P0 may be logically true or "1" and P1 may be logically false or "0" when the comparison is true. P0 may be logically false or "0" and P1 may be logically true or "1" when the comparison is false. The first simple block 42 may end at a predicated exit instruction 24. The predicated exit instruction 24 may be conditionally executed when P0 is logically true. When P0 is logically true, the program flow may follow a jump break edge. When P0 is logically false, the program flow may proceed via an edge that may lead to the second basic block 44. The second basic block 44 may comprise predicated branch instructions 26 that may be symbolized with the term "instruction #2". The second basic block 44 may end at a loopend. At the loopend, the program flow may either follow a loopback edge 104 and jump back to the loopstart at the beginning of the first basic block 42 or follow a fall edge 102 and leave the loop 20 normally. When the program flow leaves the loop 20, it may proceed with a subsequent block that may be identified with the third basic block 46. The third basic bock 46 may comprise instructions that may be symbolized with the term "instructions #3".

As already mentioned, the program flow may follow the jump break edge when P0 is logically true at the end of the first basic block 42. The jump break edge may be identified with an exit branch 18 because the exit branch 18 that contain the exit instruction may be converted to the predicated exit instruction 24. Similarly, the edge that connects the first basic block 42 to the second basic block 44 may be identified as a branch 22 that may be conditionally executed. Before the conversion of the exit branch 18 and the associated branch 22 may be executed, the comparison having result P0:P1, the exit instruction 24, and the branch instructions 26 may, for example, be realized as an "if then else"-construction. The exit instruction may, for example, be converted into the predicated exit instruction 24 having "IF.P0" as a predication 30. In the same way, the branch instructions may be converted into predicated branch instructions 26 having "IF.P1" as the predication 30. The loop 20 pictured in FIG. 5 may pass the test 70 and may be used for the algorithm.

Figure 6:
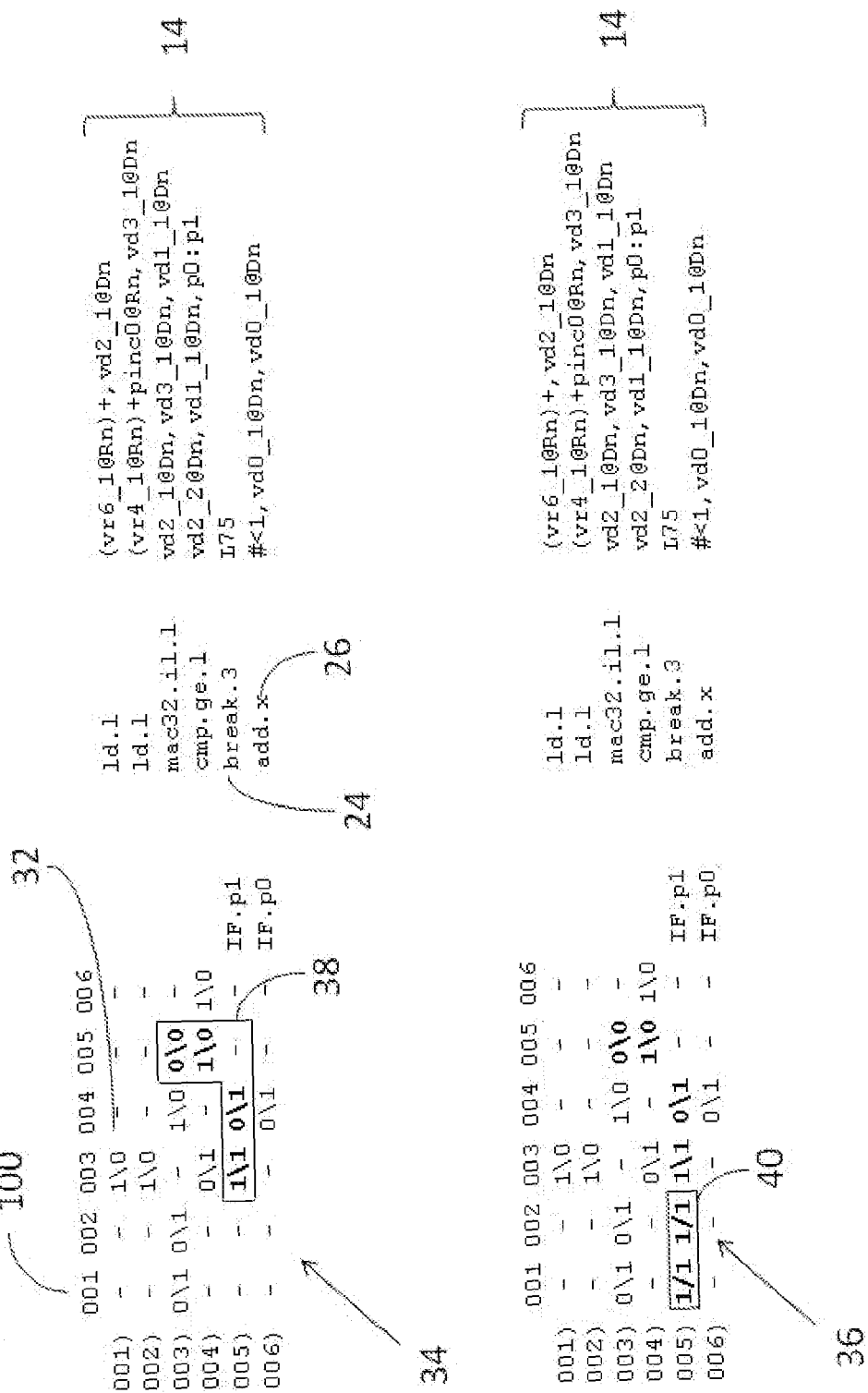
FIG. 6 schematically shows exemplary program codes with corresponding dependencies.

Now referring to FIG. 6, exemplary program codes with corresponding dependencies are schematically shown. The right side of FIG. 6 may show program code 14. The left side of FIG. 6 may show modified dependencies 34. The modified dependencies 34 may be pictured in form of a dependency graph having columns and rows. The modified dependencies 34 may comprise common dependencies 32 and additional dependencies 38. The common dependencies 32 may be pictured in normal font. The additional dependencies 38 may be pictured in bold. The columns 100 and rows of the graph may correspond directly to the pictured program code 14. The pictured program code 14 may not be machine code, and a single instruction may comprise more than one machine code instruction. A bar in the dependency graph at column X and line Y may indicate that there may be no dependency between the instructions in line X and line Y. When a dependency between two instructions exists, a tuple may represent the dependency. The first number in the tuple may describe a necessary distance between the instructions in clock cycles. For example, when the first number is 0, the instructions may be executed in parallel at the same time. The second number may describe a necessary distance between different iterations of the loop. For example, when the second number is 0, the dependency may refer to instances of instructions from the same iteration. When the second number is 0, the dependency may refer to instances of the instructions across iterations. An instance of (loop) instructions may describe the loop instructions that are executed during a specific pass of the loop. Some dependencies of the program code 14 will be explained in the following.

The program code 14 may start at line 1 with the instruction line "ld.I (vr6_1@Rn)+, vd2_1@Dn". This may describe a load instruction from a specific address (vr6_1@Rn)+ to the variable "vd2_1@Dn". This may comprise a write instruction as well as a read instruction in machine code. The second instruction line "ld.I (vr4_1@Rn)+pinc0@Rn, vd3_1@Dn" may similarly describe a load instruction from a specific address (vr4_1@Rn)+pinc0@Rn to the variable "vd3_1@Dn". As mentioned before, such an instruction may comprise a write instruction and a read instruction in machine code. The third line "mac32.il.I vd2_1@Dn, vd3_1@Dn, vd1_1@Dn" may describe a multiply instruction. The multiply instruction may comprise a write instruction and a read instruction in machine code. For example, the values of the variables "vd2_1@Dn" and "vd3_1@Dn" may be read, multiplied with each other, and the result may be written to "vd1_1@Dn". The fourth line "cmp.ge.I vd2_2@Dn, vd1_1@Dn, p0:p1" may describe a comparison instruction, wherein the values of the variables "vd2_2@Dn" and "vd1_1@Dn" may be read, and the result of the comparison may be written to "p0" and "p1". The comparison itself may be true when the value of the first variable is greater than or equal to the value of the second variable. The comparison may comprise read instructions and write instructions in machine code. The fifth line "IF.p1 break.3 L75" may describe a conditionally executed break/jump instruction that may alter the program flow of the program code 14. When the break instruction is executed, the program flow may continue at the label "L75". The jump instruction may be a predicated exit instruction 24 in a loop when the program code 14 represents the loop instructions. The condition "IF.p1" may be the predication ensuring that the predicated exit instruction 24 may be executed when p1 is logically true. The sixth line "IF.p0 add.x #<1, vd0_1@Dn, vd0_1@Dn" may describe an addition that may be conditionally executed when p0 is logically true. Of course, p0 and p1 may not be true at the same time due to the comparison at line 4. The addition at line 6 may be a predicated branch instruction 26 having the predication "IF.p0".

The multiplication at line 3 may depend on both load instructions at lines 1 and 2 because the arguments of the multiplication may be changed by the load instructions. The comparison at line 4 may depend on the multiplication at line 3 because one argument of the comparison may be the result of the multiplication. The addition at line 6 may depend on the comparison because it may be executed when the result of the comparison has a specific value. The entries in the dependency graph that represent these common dependencies 32 may be corresponding. The automatic determination of common dependencies 32 for a specific program code 14 may be well known to a person skilled in the art and may be not explained in any greater detail herein.

The additional dependencies 38 may include a first group of dependencies between the predicated exit instruction 24 and a prior loop instruction that is a write memory instruction or a write register instruction, wherein the register is used outside of the loop, and wherein the prior loop instruction is non-predicated or is predicated not opposite to a predication of the predicated exit instruction. The additional dependencies 38 may additionally include a second group of dependencies between the predicated exit instruction 24 and following non-predicated write instructions. Further, the additional dependencies 38 may include a third group of dependencies between the predicated exit instruction 24 and the following read instructions. The read instructions that may be associated with the third group dependencies may be replaced by non faulting read instructions instead of adding additional dependencies as mentioned in connection with FIG. 3 to reduce the number of additional dependencies. The additional dependencies 38 may be pictured in bold as previously mentioned. The predicated exit instruction 24 may be located at line 5. The instructions at lines 1 to 4 may comprise write instructions that may be prior to the predicated exit instruction 24. The predication of the predicated exit instruction 24, i.e., "IF.p1", may be independent from the multiplication at line 3 and the comparison at line 4. The predication "IF.p1" may not depend on a write access that writes the result of the multiplication at line 3. The comparison at line 4 includes write accesses for writing the result of the comparison at line 4 into p0 and p1. Writing the result into p0 may be independent from the predication of the predicated exit instruction 24. Similarly, write instructions as part of the load instructions at lines 1 and 2 may be independent from the predication of the predicated exit instruction 24. The additional dependencies may be accordingly entered into the lower dependency graph. In this example, the additional dependencies 38 may be related to the first group of dependencies and/or the second group of dependencies. This example may not show a non predicated read instruction that follows the predicated exit instruction 24 because the addition at line 6 may be predicated. The modified dependencies 34 in the upper graph may differ from the lower graph in excluded dependencies 40 of a fourth group. The modified dependencies 34 may exclude the fourth group of dependencies that may be "resolved" by a load speculation scheme. The term "resolved" may be used to describe that a specific dependency may be ignored because it is otherwise respected. Dependencies of the fourth group may be removed from the modified dependencies 34. The removed dependencies may be common dependencies and/or dependencies of the first group and/or dependencies of the second group and/or dependencies of the third group. Accordingly, additional dependencies 38 in the upper dependency graph may be removed between the predicated exit instruction 24 and the load instructions at the first line and at the second line. The automatic determination of modified dependencies 34 that may be resolved by a load speculation scheme may be well known to a person skilled in the art and will not be explained in any greater detail herein.

Now referring to FIG. 7, exemplary program codes are shown. The upper program code 14 may be not optimized according to the method described herein, and the lower program code 12 may be optimized according to the method described herein. Both program codes may include optimizations according to a load speculation scheme. A loop prolog 48 comprising a loop prolog end 54 and a loop epilog 52 comprising a loop epilog end 58 may be schematically pictured. The optimized program code 12 explicitly shows a loop kernel 50 that may be identified by the statements "LOOPSTART3" and "LOOPEND3". The value 3 at the end of the statements may name the loop kernel. The instructions that may be explicitly identified in FIG. 7 may be quite similar to the instructions already known from FIG. 6. A loop kernel end 56 may also be identified in the optimized program code 12. A portion of the loop kernels 50 may be executed in parallel. This portion may be indicated by the signs "[" and "]" in the left column of the optimized program code 12. As shown in FIG. 7, the portion of the loop kernel 50 that may be executed in parallel may be increased when the method is applied to the program code. This may lead to a faster execution of the computer program.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, a non programmable hardware system that is exclusively designed for executing the method described herein. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A computer system for generating an optimized program code from a program code having a loop with an exit branch, the computer system comprising:
    a compiler program including an algorithm stored on a computer readable storage medium; and
    a processing unit coupled to the computer readable storage medium to execute the compiler program to:
        convert first and second non-predicated exit instructions of corresponding first and second exit branches of a program loop of program code for a target processor, each of the first and second exit branches to exit the program loop, into a corresponding first and second predicated exit instruction of the corresponding first and second exit branches, the first exit branch having a first destination;
        determine common dependencies for dependencies between loop instructions within the program loop;
        determine additional dependencies for dependencies between the first and second predicated exit instructions and the loop instructions within the program loop, the additional dependencies comprising:
            a first group of dependencies including dependencies between the first predicated exit instruction and a prior loop instruction of the program loop that is a write memory instruction or a write register instruction, wherein a write register of the write register instruction is used outside of the program loop, and the prior loop instruction is either non-predicated or is predicated; and
            a second group of dependencies comprising dependencies between the first predicated exit instruction and a following loop instruction that is a read memory instruction;
        generate modified dependencies based on the common dependencies and the additional dependencies to exclude dependencies that are resolved by a load speculation scheme;
        apply the algorithm to implement software pipelining for the program loop of the target processor based on the modified dependencies; and
        convert the first predicated exit instruction of the first exit branch into a third non-predicated exit instruction of a third branch having a third destination that is different than the first destination of the first exit branch after the algorithm has been applied.

2. The computer system as claimed in claim 1, wherein the additional dependencies comprise:
    a third group of dependencies comprising dependencies between the predicated exit instruction and a following loop instruction that is a non-predicated write instruction.

3. The computer system as claimed in claim 2, wherein the processing unit is arranged to replace a read instruction that is associated with the second group of dependencies by a non-faulting read instruction.

4. The computer system as claimed in claim 1, wherein the processing unit is arranged to remove at least one of the modified dependencies based on a directive instruction that manually indicates an independency.

5. The computer system as claimed in claim 1, wherein the processing unit is arranged to add at least one dependency to the modified dependencies based on a directive instruction that manually indicates a dependency.

6. The computer system as claimed in claim 1, wherein the processing unit is arranged to generate a loop prolog, a loop kernel, and a loop epilog when the algorithm is completed.

7. The computer system as claimed in claim 1, wherein the processing unit is arranged to apply further optimizing algorithms to the optimized program code.

8. The computer system as claimed in claim 1,
    wherein the processing unit is arranged to check the program loop based on a test, and
    wherein the processing unit is arranged to apply the algorithm to the program loop when the program loop passes the test.

9. The computer system as claimed in claim 1, wherein the processing unit is arranged to apply the algorithm to the program loop based on a directive instruction that marks the program loop for applying the algorithm.

10. A method for generating comprising:
    converting, by a compiler program including an algorithm stored on a computer readable storage medium executed by a processing unit coupled to the computer readable storage medium, first and second non-predicated exit instructions of corresponding first and second exit branches of a program loop of program code for a target processor, each of the first and second exit branches to exit the program loop, into a corresponding first and second predicated exit instruction of the corresponding first and second exit branches, the first exit branch having a first destination;

determining common dependencies for dependencies between loop instructions within the program loop;
determining additional dependencies for dependencies between the first and second predicated exit instructions and the loop instructions within the program loop, the additional dependencies comprising:
  a first group of dependencies including dependencies between the first predicated exit instruction and a prior loop instruction of the program loop that is a write memory instruction or a write register instruction, wherein a write register of the write register instruction is used outside of the program loop, and the prior loop instruction is non-predicated or are predicated; and
  a second group of dependencies comprising dependencies between the first predicated exit instruction and a following loop instruction that is a read memory instruction;
generating modified dependencies based on the common dependencies and the additional dependencies to exclude dependencies that are resolved by a load speculation scheme;
applying an algorithm to implement software pipelining for the program loop of the target processor based on the modified data dependencies; and
converting the first predicated exit instruction of the first exit branch into a third non-predicated exit instruction of a third branch having a third destination that is different than the first destination of the first exit branch.

11. A computer system comprising:
a compiler program including an algorithm stored on a computer readable storage medium; and
a processing unit coupled to the computer readable storage medium to:
  execute the compiler program to:
    convert first and second non-predicated exit instructions of corresponding first and second exit branches of a program loop of program code for a target processor, each of the first and second exit branches to exit the program loop, into a corresponding first and second predicated exit instruction of the corresponding first and second exit branches, the first exit branch having a first destination;
    determine common dependencies for dependencies between loop instructions within the program loop;
    determine additional dependencies for dependencies between the first and second predicated exit instructions and the loop instructions within the program loop, the additional dependencies comprising:
      a first group of dependencies including dependencies between the first predicated exit instruction and a prior loop instruction of the program loop that is a write memory instruction or a write register instruction, wherein a write register of the write register instruction is used outside of the program loop, and the prior loop instruction is non-predicated or are predicated; and
      a second group of dependencies comprising dependencies between the first predicated exit instruction and a following loop instruction that is a read memory instruction;
    generate modified dependencies based on the common dependencies and the additional dependencies to exclude dependencies that are resolved by a load speculation scheme;
    apply the algorithm to implement software pipelining for the program loop of the target processor based on the modified dependencies;
    convert the first predicated exit instruction of the first exit branch into a third non-predicated exit instruction of a third branch having a third destination that is different than the first destination of the first exit branch after the algorithm has been applied; and
    move the third destination of the third branch to a loop epilog end of a loop epilog of the program loop.

12. The computer system as claimed in claim 11, wherein the additional dependencies comprise:
a third group of dependencies comprising dependencies between the first predicated exit instruction and a following loop instruction of the program loop that is a non-predicated write instruction.

13. The computer system as claimed in claim 12,
wherein the processing unit is arranged to replace a read instruction that is associated with the second group of dependencies by a non-faulting read instruction.

14. The computer system as claimed in claim 11, wherein the processing unit is arranged to remove at least one of the modified dependencies based on a directive instruction that manually indicates an independency.

15. The computer system as claimed in claim 11, wherein the processing unit is arranged to add at least one dependency to the modified dependencies based on a directive instruction that manually indicates a dependency.

16. The computer system as claimed in claim 11, wherein the processing unit is arranged to generate a loop prolog, a loop kernel, and the loop epilog when the algorithm is completed.

17. The computer system as claimed in claim 11, wherein the processing unit is arranged to apply further optimizing algorithms to the optimized program code.

18. The computer system as claimed in claim 11, wherein the processing unit is arranged to check the program loop based on a test, and
wherein the processing unit is arranged to apply the algorithm to the program loop when the program loop passes the test.

19. The computer system as claimed in claim 11,
wherein the processing unit is arranged to replace a read instruction that is associated with the second group of dependencies by a non-faulting read instruction.

* * * * *